(12) United States Patent
Sanghvi

(10) Patent No.: US 7,624,174 B2
(45) Date of Patent: Nov. 24, 2009

(54) SELF-LEARNING METHOD AND SYSTEM FOR DETECTING ABNORMALITIES

(75) Inventor: Ashvinkumar Jayantilal Sanghvi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 10/685,472

(22) Filed: Oct. 16, 2003

(65) Prior Publication Data

US 2005/0125710 A1 Jun. 9, 2005

Related U.S. Application Data

(60) Provisional application No. 60/472,512, filed on May 22, 2003.

(51) Int. Cl.
*G06F 15/173* (2006.01)

(52) U.S. Cl. ..................................... 709/224
(58) Field of Classification Search .................. 709/224
See application file for complete search history.

(56) References Cited

U.S. PATENT DOCUMENTS

| | | | |
|---|---|---|---|
| 5,602,761 A * | 2/1997 | Spoerre et al. | ............... 702/179 |
| 5,835,902 A | 11/1998 | Jannarone | |
| 6,182,022 B1 | 1/2001 | Mayle et al. | |
| 6,216,119 B1 | 4/2001 | Jannarone | |
| 6,289,330 B1 | 9/2001 | Jannarone | |
| 6,591,255 B1 | 7/2003 | Tatum et al. | |
| 6,647,377 B2 | 11/2003 | Jannarone | |
| 6,876,988 B2 | 4/2005 | Helsper et al. | |

(Continued)

FOREIGN PATENT DOCUMENTS

WO WO9614616 A1 5/1996

(Continued)

OTHER PUBLICATIONS

Carpenter et al., "ARTMAP: supervised real-time learning and classification of nonstationary data by a self-organizing neural network", Neural Networks for Ocean Engineering, 1991., IEEE Conference on Aug. 15-17, 1991 pp. 341-342.*

(Continued)

*Primary Examiner*—Vivek Srivastava
*Assistant Examiner*—William J Goodchild
(74) *Attorney, Agent, or Firm*—Shook, Hardy & Bacon L.L.P.

(57) ABSTRACT

The present invention is directed to a method and system for use in a computing environment to monitor parameters and detect abnormalities. A monitoring system for monitoring a process may include a signature creation module for creating a signature representative of the process, a signature updating module for continuously updating the created signature, and an abnormality detection module for detecting abnormalities based upon deviations from the updated signature. The system may perform a method for detecting abnormalities occurring during a process based upon the continuously updated signature representative of the process. The method may include continuously monitoring a system parameter and computing a normal range of values for the system parameter based on the continuously updated signature. The method may additionally include determining if the monitored system parameter is within the normal range and indicating existence of an abnormality if the monitored system parameter is outside of the normal range.

38 Claims, 10 Drawing Sheets

U.S. PATENT DOCUMENTS

| | | | |
|---|---|---|---|
| 2002/0016781 A1 | 2/2002 | Jannarone | |
| 2002/0049687 A1 | 4/2002 | Helsper | |
| 2002/0087679 A1* | 7/2002 | Pulley et al. | 709/224 |
| 2002/0188582 A1 | 12/2002 | Jannarone | |
| 2003/0139905 A1* | 7/2003 | Helsper et al. | 702/182 |
| 2005/0091005 A1 | 4/2005 | Huard | |

FOREIGN PATENT DOCUMENTS

| | | | |
|---|---|---|---|
| WO | WO0244901 A2 | 6/2002 | |
| WO | WO02101643 A2 | 12/2002 | |
| WO | WO03/009140 | * | 1/2003 |
| WO | WO03009140 A2 | 1/2003 | |
| WO | WO03054704 A1 | 7/2003 | |
| WO | WO2005045678 A2 | 5/2005 | |

OTHER PUBLICATIONS

McGee et al., "System and Method for Adaptive Threshold Determination for Performance Metrics", International Publication No. WO 03/009140, Published Jan. 30, 2003.*

* cited by examiner

SELF-LEARNING METHOD AND SYSTEM FOR DETECTING ABNORMALITIES

CROSS-REFERENCE TO RELATED APPLICATIONS

Priority is claimed in the present application pursuant to 35 U.S.C. § 119(e) from provisional application Ser. No. 60/472,512 filed May 22, 2003.

STATEMENT REGARDING FEDERALLY SPONSORED RESEARCH OR DEVELOPMENT

None.

TECHNICAL FIELD

Embodiments of the present invention relate to automated techniques for detecting abnormalities during a cyclical or other type of processes in order to facilitate system management. More particularly, embodiments of the invention are directed to detecting abnormalities in the behavior of a computerized system or process and for tracking business key performance indicators.

BACKGROUND OF THE INVENTION

With increased use of networked computing devices and systems, it has become necessary to monitor these systems for difficulties since these difficulties can have a far-reaching impact. Monitoring these systems manually in a traditional manner is impractical and in many instances is impossible.

Seasoned experts can listen to the "hum" of an engine or hundreds of machines in a factory and determine if the machines are operating properly. This technique cannot be used effectively with servers or data centers. Analysis of a server or data center requires a subject matter expert who is familiar with the normal ebb and tide of the business cycles and specific effects on the server in question that will enable the expert to make hundreds of measurements before coming up with a conclusion. Performing this analysis manually on hundreds of servers in a data center or across an enterprise would be overly burdensome and probably impossible.

Accordingly, techniques have been developed for monitoring computing systems for abnormalities. One technique identifies parameters for sampling and compares the sampled results against a fixed threshold. If the fixed threshold is exceeded, the technique identifies an abnormality. This technique often obtains erroneous results. Since no two systems are likely to have identical configurations, conditions, and usage patterns, thresholds are difficult to set. If the threshold has been set too high, a large percentage of abnormalities go undetected and if the threshold has been set too low, the technique will result in an excessive number of alerts in normal situations. Hence despite cost and complexity, this technique causes over-reporting in some areas and under-reporting in others and even these areas change over a period of a single day.

Currently, a significant portion of the data collected from agents is numeric data. The portion can increase ten to one hundred or more times as the number of variables tracked and the resolution needed increases. The data may ultimately be used for aggregation, trending, and capacity planning and reporting. In most cases the raw data collected is never used. The burden of this data collection seriously limits scalability.

These difficulties have resulted in customer demands for consulting services for fine-tuning of thresholds. Customers additionally have increased demands for knowledge authoring environments so that administrators can make custom changes and for provisions for overriding rules including conflict resolution policies at a group and server level. Additionally, customers have increased demands for deep discovery of attributes for personalization at a per instance level.

Unfortunately, these demands have been difficult to meet. Most administrators do not understand the variables involved in their systems and additionally do not understand their own installations well enough to set thresholds judiciously. Furthermore, personalization on a large number of servers is too large of a task even for experts. Consulting based solely on system parameters fails to account for cyclical business rhythms and is apt to overlook a majority of abnormalities. Finally, even if consultants are initially able to address the needs of a particular system, the thresholds become rapidly obsolete as business cycles and configurations change.

Currently existing techniques using consulting agents have involved a large amount of data collection and storage. The amount of data can increase rapidly as variables are tracked over time. Much of the data collected is never used and the retention of excessive data limits system scalability.

A technique is needed for automatically providing abnormality detection while avoiding the aforementioned difficulties. The technique should avoid retention of excessive data and should be adaptable to functioning within a variety of environments and processes.

BRIEF SUMMARY OF THE INVENTION

In one aspect, the present invention is directed to a method for monitoring a process. The method includes creating a signature representative of the process, continuously updating the created signature, and detecting abnormalities based upon the continuously updated signature.

In a further aspect, the invention includes a method for detecting abnormalities occurring during a process based upon a continuously updated signature representative of the process. The method includes continuously monitoring a system parameter, computing a normal range of values for the system parameter based on the continuously updated signature, determining if the monitored system parameter is within the normal range, and indicating existence of an abnormality if the monitored system parameter is outside of the normal range.

In an additional aspect, the invention includes a method for creating a signature useful for detecting abnormalities in a computing system environment. The method includes setting a learning responsiveness constant; monitoring a system parameter and adjusting the learning responsiveness constant at fixed intervals until a desired value is reached. The method additionally includes calculating an average and standard deviation for each interval and using the average, standard deviation and learning responsiveness constant to create the signature.

In a further aspect, the invention includes a system for detecting abnormal activity in a computerized environment. The system includes monitoring tools for continuously monitoring a system parameter, a continuously updated signature representative of normal values of the system parameter, and an abnormality indicator calculated based on the continuously updated signature, the abnormality indicator including a range of normal values for the system parameter.

In yet an additional aspect, the invention includes a monitoring system for monitoring a process. The monitoring system includes a signature creation module for creating a signature representative of the process, a signature updating module for continuously updating the created signature, and an abnormality detection module for detecting abnormalities based upon deviations from the updated signature.

BRIEF DESCRIPTION OF THE DRAWINGS

The present invention is described in detail below with reference to the attached drawings figures, wherein.

DETAILED DESCRIPTION OF THE INVENTION

Embodiments of the present invention are directed to a system and method for detecting abnormalities within a computerized system or business process. Embodiments of the invention have the capability to continuously monitor the computerized system or business process, to create and continuously update a signature descriptive of the system or process, and to detect abnormal occurrences in the computerized system or business process based on the updated signature.

A system and method of the invention construct and continuously update a signature of a time variant signal that follows a certain business cycle. The signature has at least two purposes including: (1) identifying an abnormality as it is occurring; and (2) computing an updated signature from the samples from the last business cycle. The system obviates the need for storing historical raw data.

Having briefly provided an overview of the present invention, embodiments of the invention will be discussed with reference to FIGS. 1-9. An exemplary operating environment for the present invention is described below.

Exemplary Operating Environment

Figure 1:
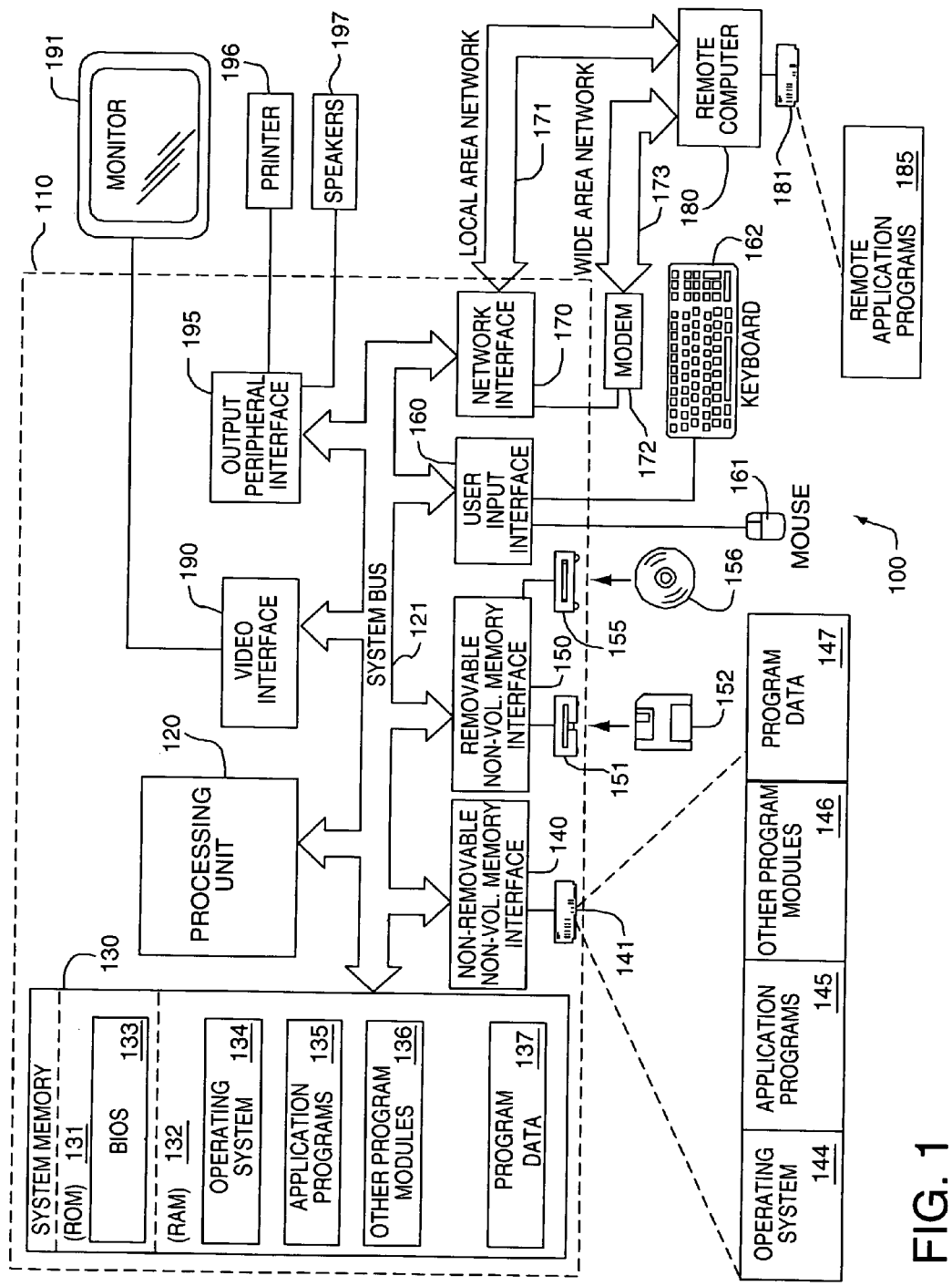
FIG. 1 is an exemplary computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Embodiment of the System

Figure 2:
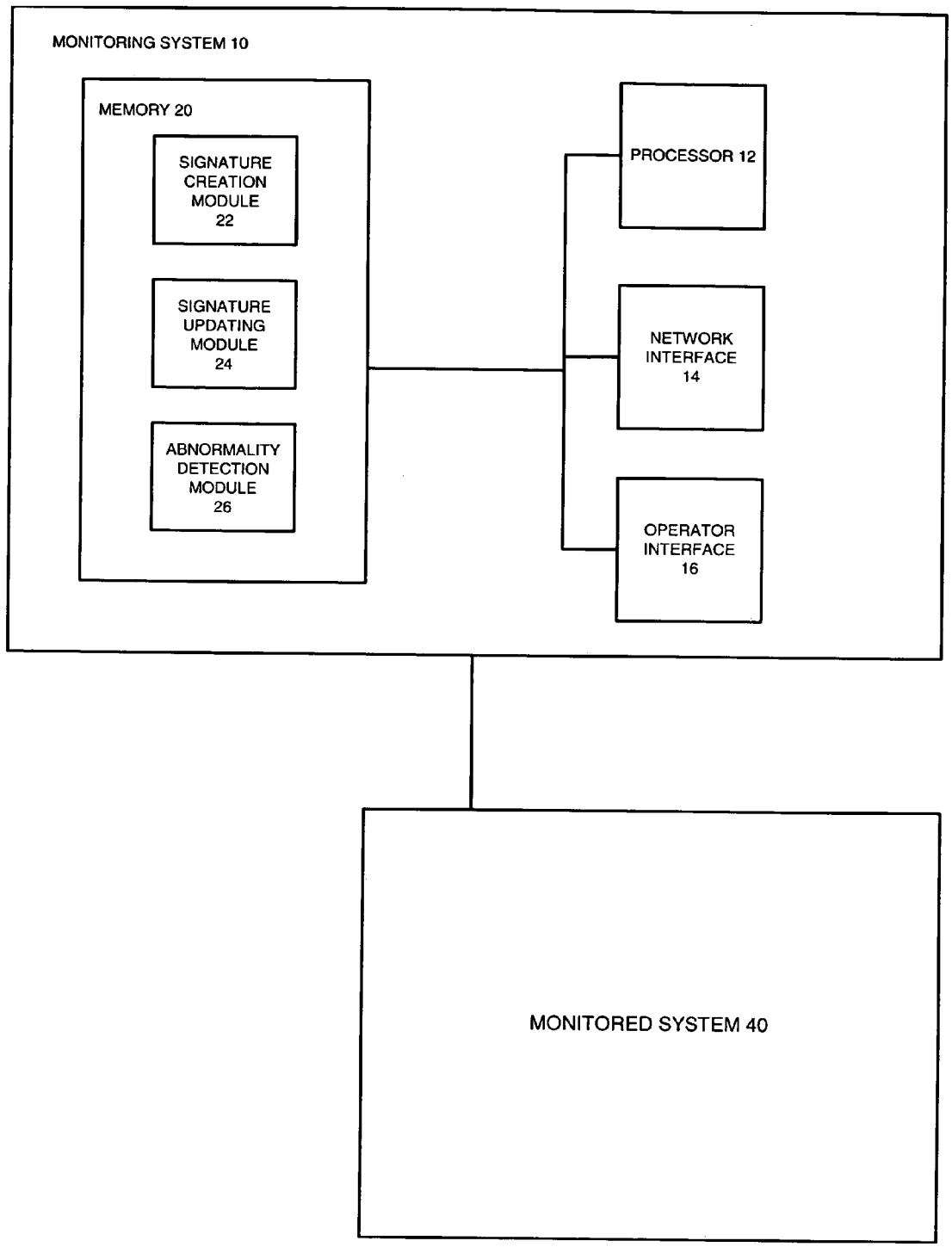
FIG. 2 is a block diagram illustrating components of a system of an embodiment of the invention.

FIG. 2 is a block diagram illustrating components of a system of an embodiment of the invention. A monitoring system 10 is connected with a system 40 for monitoring selected parameters. The monitoring system 10 may include a processor 12, a network interface 14, an operator interface 16 and a memory 20. The processor 12, network interface 14 and memory 20 may be substantially similar to those described above with reference to FIG. 1. The memory 20 may include a signature creation module 22, a signature updating module 24, and an abnormality detection module 26.

The above-identified components operate to measure a plurality of system related variables. Some of these variables are time variant numeric variables. One variable that might be measured is a usage variable for measuring simultaneous sessions or number of transactions. Usage variables provide an indication of the stress being applied to a system from its consumers. Examples of usage variables include: (1) number of users simultaneously logged on; (2) number of transaction requests per second: (3) rate of request arrivals; (4) packets received per second; and (5) web hits per second. In most production environments, usage follows a business cycle pattern by rising during business hours and dropping off at non-business hours and weekends, etc. The weekly cycle usually has a very consistent pattern. Usually, a usage measure that greatly exceeds or falls below normal is an indicator of trouble or an abnormality.

Another set of system variables relate to utilization. These variables indicate the strain in a system as a result of the stress applied. Examples of these variables include: (1) CPU utilization; (2) queue lengths; (3) task switches per second; (4) memory utilization, etc. Utilization is normally a function of usage and hence also follows business cycles described above. However, these variables cannot be handled identically to usage in all respects. For instance, a sum of queue lengths or CPU utilization across all nodes in a cluster has no meaning. Usually utilization that greatly exceeds or falls below normal is an indicator of trouble or an abnormality.

Another set of system variables includes errors or warnings. In most cases these errors or warnings are a result of mal-function or mis-configuration. Examples of errors or warnings include: (1) malformed requests; (2) parity errors; (3) 404 errors; (4) critical events; (5) logon errors etc. Some errors are "normal". Examples of "normal" errors include: (1) routers dropping packets by design when overloaded; (2) an accepted bit error rate of WANs; (3) pages that give a 404 error due to constantly changing web content; and (4) some portion of the population will mistype username/password when logging on. Hence even errors have a "normal" pattern.

The above-mentioned variables may be measurements of turn around time for service requests. Examples of such services and requests include: (1) ping response times; (2) transaction response times; (3) disk write response times etc. Customers may enter into Operation Level Agreements (OLAs) with the service provider to maintain turn-around-time at an acceptable level. Though response times are related to usage, the relationship is non-linear. Response times also increase rapidly with error rates.

Figure 3:
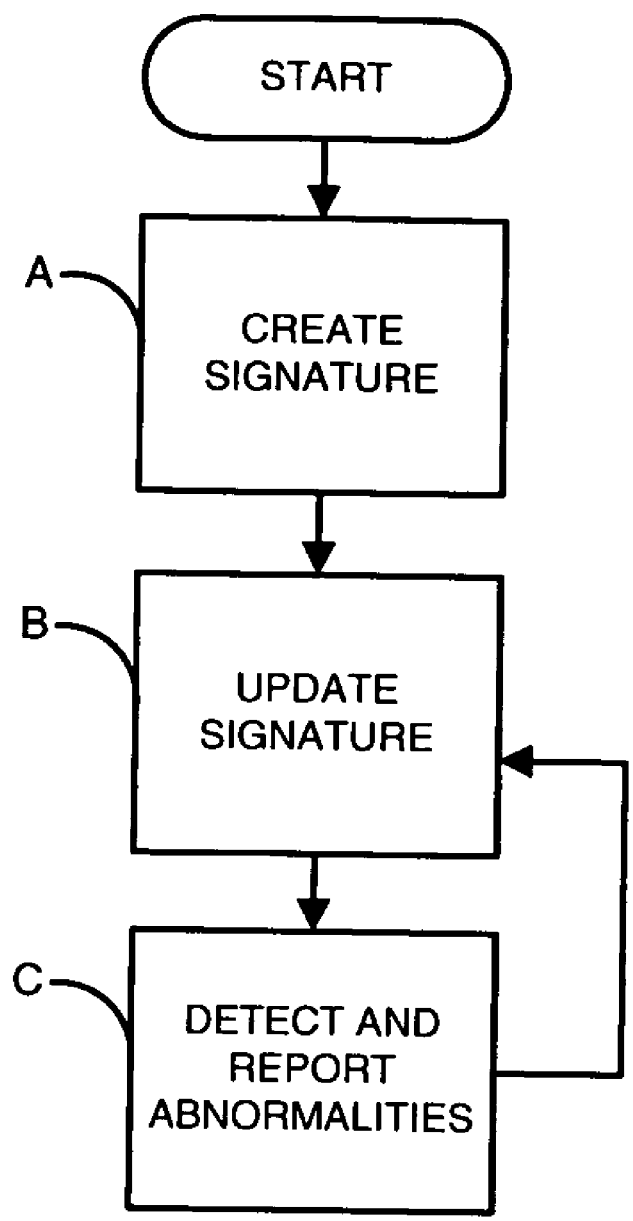
FIG. 3 is a flow chart illustrating a method in accordance with an embodiment of the invention.

FIG. 3 is a flow chart illustrating a method in accordance with an embodiment of the invention. In procedure A, the monitoring system 10 creates a signature. In procedure B, the monitoring system 10 updates the signature. In procedure C, the monitoring system 10 detects and reports abnormalities.

The above-mentioned signature involves components that make it a more accurate mechanism for detecting abnormalities than the known threshold technique. One component of the signature is the "average" value. One technique for using the average value may involve simply takings samples of all relevant variables and keeping running averages of them. New samples would reveal an abnormality if they are not within a "reasonable range" of this average. However, due to the large differences in average values during peak usage versus off hours, the system uses a more refined concept of the average value in order to achieve the desired accuracy.

The signature will therefore utilize the concept of average by time. The concept of average by time involves sampling variables periodically and calculating averages at various intervals. For example, the monitoring system could sample variables every three minutes, and calculate averages at fifteen-minute intervals for a week. The system would save the information and use it in the signature.

As the system acquires new samples, it calculates their average over fifteen minutes and compares it to the "signature". The comparison enables the system to flag abnormalities. Time sensitive averaging accounts for variability in business cycles. However, the system additionally should determine a reasonable range around the average in which no abnormality is deemed to have occurred.

Although a constant value might be used for a "reasonable range", use of a constant value may lead to difficulties. For instance, a bank may close at 7 PM daily. The bank staff performs nightly processing before leaving. Some days may involve larger backlogs compared to others. Hence the processing rate between 7:30-8:00 is very unpredictable. The use of a constant value as a reasonable range may generate a large number of alerts during those erratic times, and raising that number has the effect of losing legitimate discrepancies elsewhere. The constant envelope around the averages is inaccurate for those situations.

Accordingly, the signature uses a standard deviation to measure a reasonable range. The signature uses the standard deviation for every interval and expresses the envelope or reasonable range as a multiple. Accordingly, the envelope or reasonable range is more forgiving around turbulent times during the weekly business cycle, and tighter around normal times. Standard deviation may be expressed as below:

$$\text{Sigma}^2 = 1/N (\text{Summation of } (X_i - X_{avg})^2) \quad (1)$$

where N is the number of samples, $X_i$ is the current average and $X_{avg}$ is the calculated average.

In this case, the signature is expressed as an array over every time interval of the business cycle of the average and standard deviation. The envelope may be expressed as $$\text{Envelope} = X_{avg} +/- F*\text{Sigma}^2. \quad (2)$$

where F is tolerance.

Embodiments of the Method

Figure 4A:
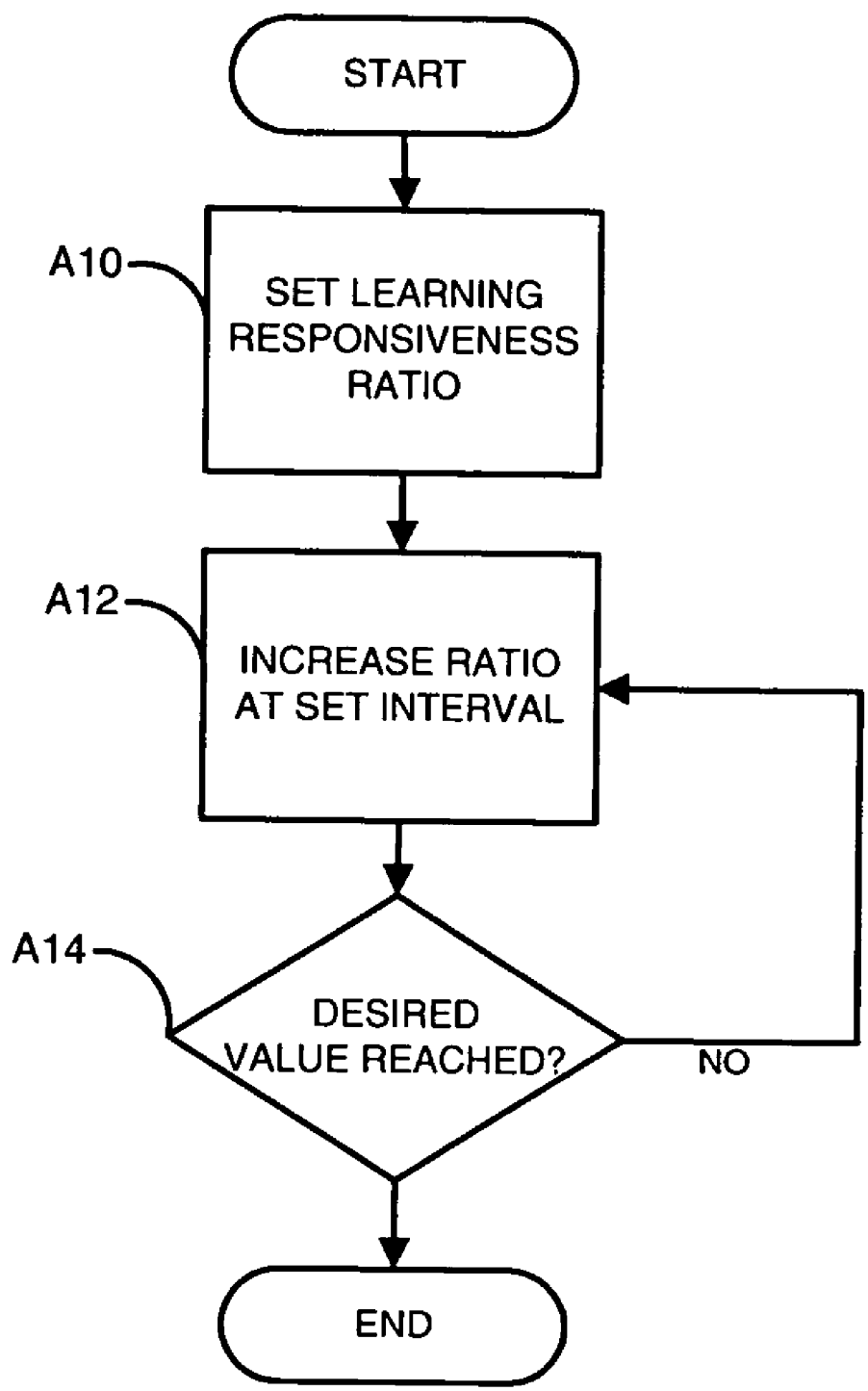
FIG. 4A is a flow chart illustrating a portion of a method for creating a signature in accordance with an embodiment of the invention.
Figure 4B:
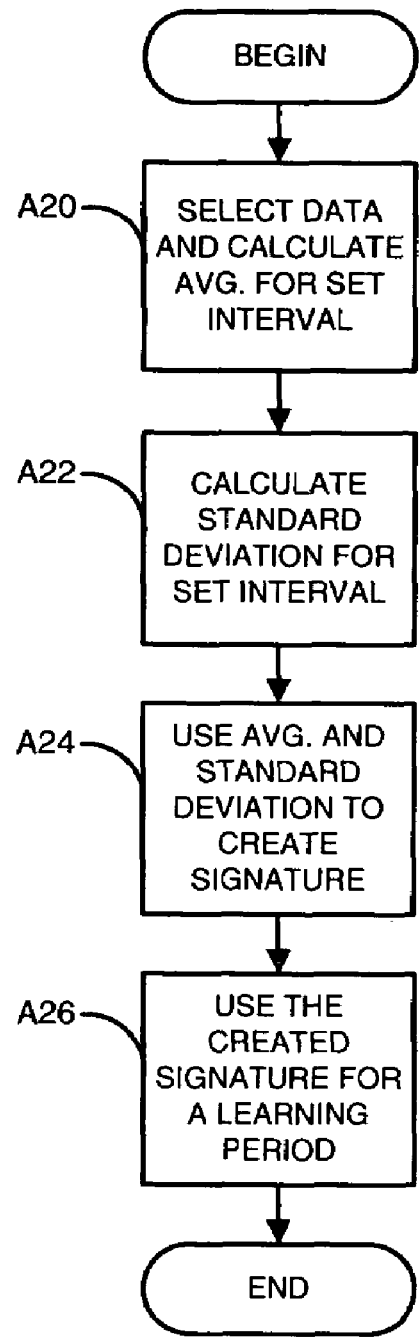
FIG. 4B is a flow chart illustrating further procedures involved in a method for creating a signature in accordance with an embodiment of the invention.

FIGS. 4A and 4B further illustrate creation of a signature performed in procedure A of FIG. 3. The creation of a signature is accomplished using two simultaneously applied methods. The two methods involve an accelerated learning component and a fake repeats component. FIG. 4A illustrates the accelerated learning component and FIG. 4B illustrates a fake repeats component.

FIG. 4A is a flow chart illustrating a component of a method for creating a signature in accordance with an embodiment of the invention. In step A10, the monitoring system 10 sets a learning responsiveness ratio. In step A12, the learning responsiveness ratio is increased at a pre-set interval. If the desired value of the learning responsiveness ratio is reached in step A14, the process ends. If the desired value has not been reached, the learning responsiveness ratio is again increased at the set interval in step 12. The process ends when the learning responsiveness ratio reaches a desired value. For example, during a first learning week, the monitoring system sets "1/Learning Responsiveness Constant" to 0. In the following week, the monitoring responsiveness system sets the ratio to 1, then 2 and so on until a desired set rate is reached. This process accelerates the learning when insufficient history exists. When enough history is built, the ratio is adjusted to the desired target automatically.

FIG. 4B is a flow chart illustrating further procedures involved in a method for creating a signature in accordance with an embodiment of the invention. In step A20, the signature creation module 22 of the monitoring system 10 selects data and calculates an average data value for a set interval. In step A22, the signature creation module 22 calculates a standard deviation for the set interval. In step A24, the signature creation module 22 creates a signature using the calculated average and standard deviation. In step A26, the signature creation module 22 uses the created signature for a learning period.

Initially the running average and deviation are repeated throughout the signature for the day, after the first day, the signature for the day is repeated across the week, from then on, normal signature updates continue. During the first week, the signature will appear to approximate a straight band for a day, a daily repeated envelope the second day, and will take the form of a typical signature at the end of a week. The early signature may cause some false positives but will provide more accurate information as it evolves.

Figure 5:
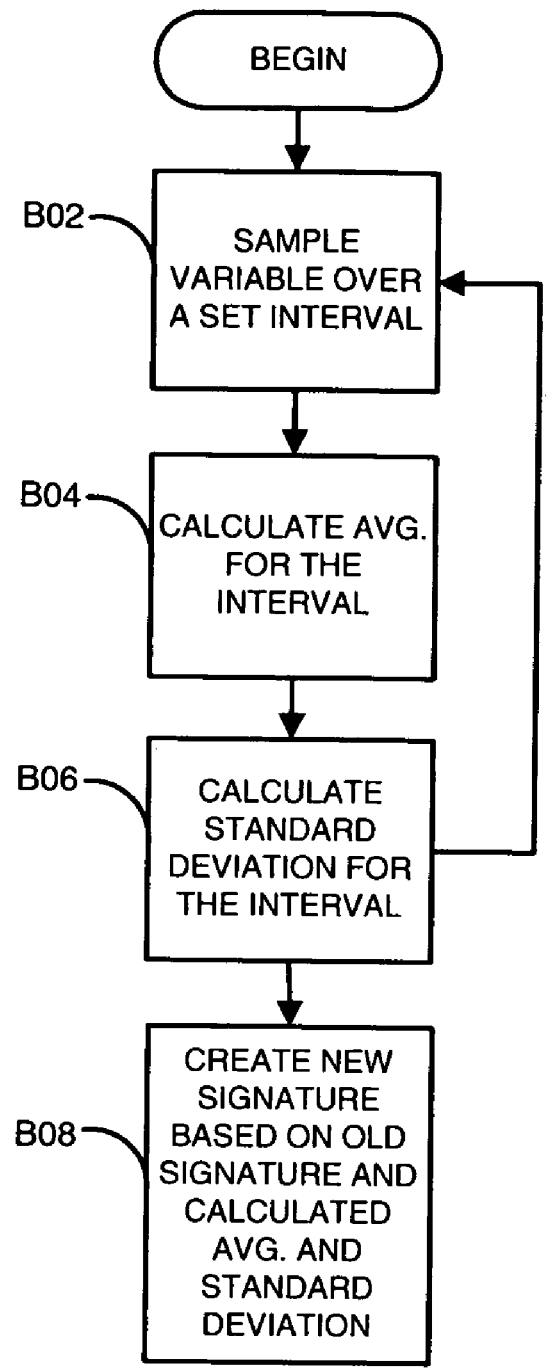
FIG. 5 is a flow chart illustrating a method for updating the signature in accordance with an embodiment of the invention.

FIG. 5 is a flow chart illustrating a method for updating the signature in accordance with an embodiment of the invention. In step B02, the signature updating module 24 samples the selected variable over a set interval. In step B04, the signature updating module 24 calculates an average for the set interval. In step B06, the signature updating module 24 calculates a standard deviation for the set interval. In step B08, the signature updating module 24 creates the new signature based on the old signature, the calculated average and the standard deviation.

The above-described process of learning over time takes into account variations in business volume over time. However, it is also necessary to ensure that certain times may be given more weight in certain situations than others. For example, a security brokerage experiences large volumes during what is known as "triple witching hour" that occurs on a Friday every three months. In another example, a recently opened store starts with a low business volume. However, for its first year as the word spreads, the store does more business. The signature should ensure that the latest data has more of an impact than the earlier data. Accordingly, the system should learn and adjust itself automatically over long periods of time.

The system accomplishes this goal by using weighted averages-between current data and the values in the signature. If the average and standard deviation for Wednesday between 4 and 4:15 are $XC_{avg}$ and SigmaC respectively and the signature for 4-4:15 on Wednesday is $XS_{avg}$ and SigmaS, the new signature value may be expressed as follows:

$$\text{New } XS_{avg} = W1*(XS_{avg}) + W2*(XC_{avg}) \quad (3)$$

$$\text{New SigmaS}^2 = W1*(\text{SigmaS}^2 + XS_{avg}^2) + W2(\text{SigmaC}^2 + XC_{avg}^2) - (\text{New } XS_{avg}^2) \quad (4)$$

The model sets W1+W2=1 where W1 is the weight of the signature and W2 is the weight of current data. W2/W1 is the learning responsiveness constant ratio described above. The larger the value, the faster learning occurs and the dimmer the memory of the past becomes. For example, if W1=⅔ and W2=⅓, the impact of today's data will be $1/3^{rd}$ today, $2/9^{th}$ next week and $4/27^{th}$ the week after and so on.

The above-described technique is computationally very efficient since it allows updating of the signature using only the current data. The system does not require retaining large amounts of old data.

Figure 6:
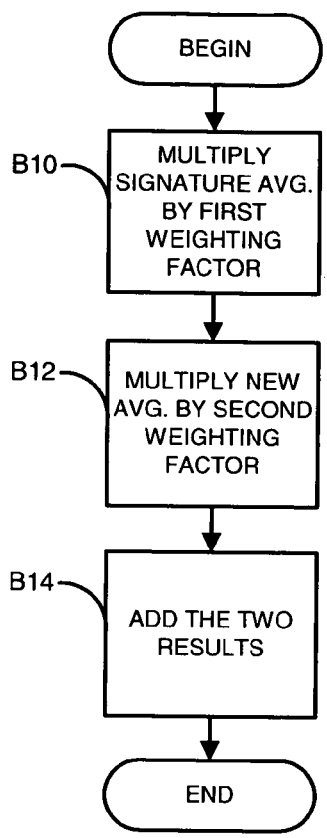
FIG. 6 is a flow chart illustrating a method for obtaining a signature component in accordance with an embodiment of the invention.

FIG. 6 is a flow chart illustrating the method described above for obtaining a signature component in accordance with an embodiment of the invention. In step B10, the monitoring system 10 multiplies a signature average by a first weighting factor. In step B12, the monitoring system multiples the newly calculated average by a second weighting factor. In step B14, the monitoring system 10 adds the results from step B12 and step B10.

Figure 7:
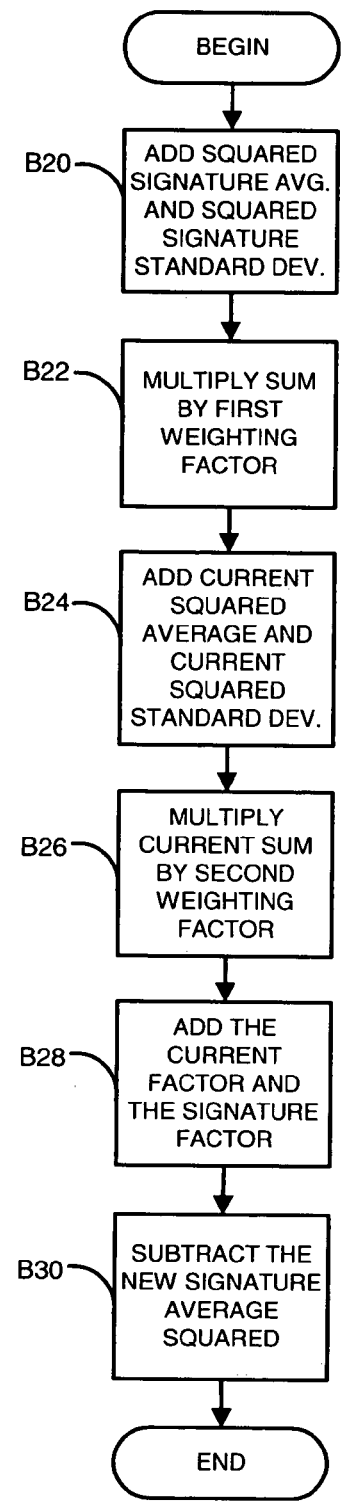
FIG. 7 is a flow chart illustrating a method for obtaining another signature component in accordance with an embodiment of the invention.

FIG. 7 is a flow chart illustrating a method for obtaining another signature component in accordance with an embodiment of the invention. In step B20, the monitoring system adds the squared signature average and squared standard deviation. In step B22, the monitoring system 10 multiplies the sum of step B20 by a first weighting factor. In step B22, the monitoring system 10 adds the current squared average and the current squared standard deviation. In step B26, the monitoring system multiples the sum of B24 by a second weighting factor. In step B28, the monitoring system adds the factor from step B24 and the signature factor. In step B20, the monitoring system subtracts the square of the new signature average.

The above-described factors help to fine-tune the signature to account for variations in amplitude. Other features can be provided to ensure that the signature is able to accurately reflect variations in occurrence times. Events often happen earlier or later than expected. For instance, if a snowstorm delays all arrivals by half an hour, an excessive number of alerts may be registered. The system resolves this problem by computing moving averages and deviations over an interval of time and comparing against the same on the signature calculated over even a broader interval that straddles the current interval.

For example, if the system is sampling data every 3 minutes, at 4:15, it may compute the moving average for the past 10 samples (from 3:45 to 4:15) and compare against the signature value at 4:30 computed over 20 samples (computed from 3:30 to 4:30). In this manner, only discrepancies that are present and persisting will get flagged, while any shift in time back or forth within the interval does not give false positives. Two constants, jitter spread and jitter offset, are introduced as controls. In this case the spread is thirty minutes and the offset is fifteen minutes. The time tolerance in this case may be selected as one hour (jitter spread+two times offset). Accordingly, a large spike that comes half an hour earlier or later than expected by the signature does not cause a false positive abnormality. In strictly regimented businesses, the time tolerance can be tightened.

Figure 8:
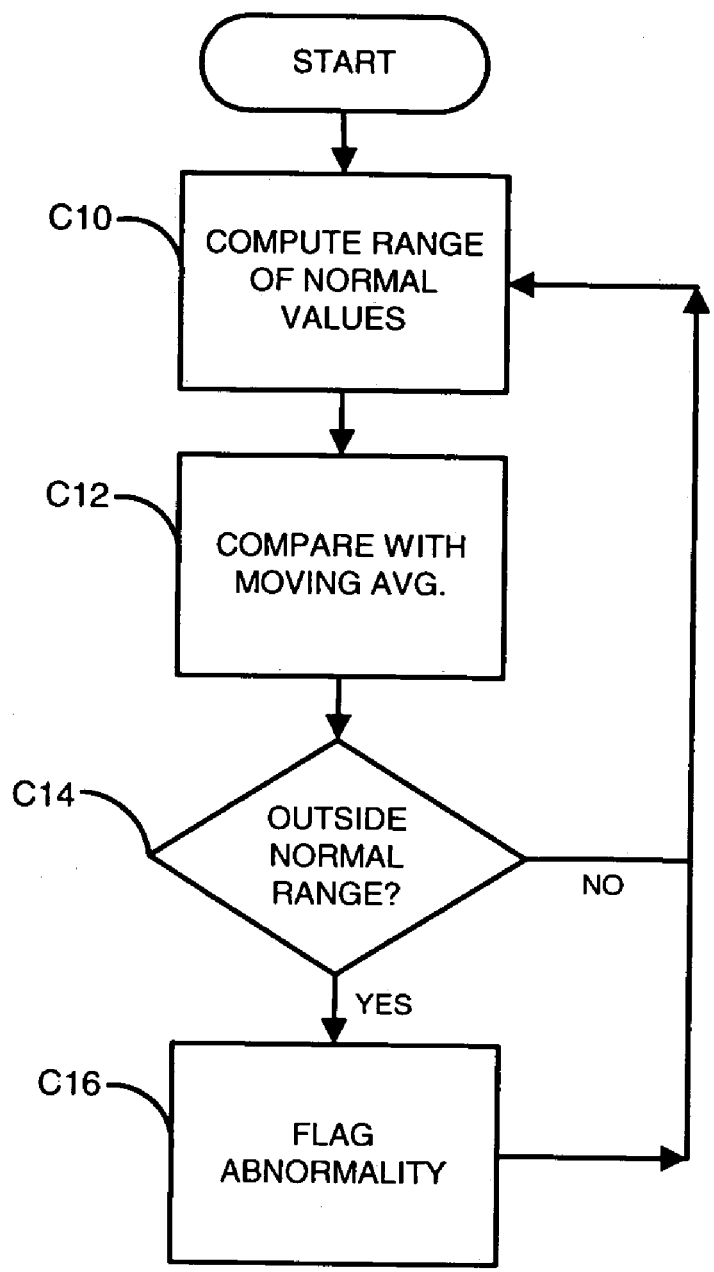
FIG. 8 is a flow chart illustrating a method for detecting abnormalities in accordance with an embodiment of the invention.

FIG. 8 is a flow chart illustrating a method for detecting abnormalities in accordance with an embodiment of the invention. In step C10, the abnormality detection module 26 computes a range of normal values. In step C12, the abnormality detection module 26 compares the computed range with a moving average. In step C14, the abnormality detection module determines if the moving average is outside the normal range. If the average is outside the normal range in step C14, the abnormality detection module 26 flags the abnormality and the process repeats. If the average is not outside the normal range in step C14, the process repeats.

Normalcy and abnormalities are subjective. Customers want an attenuation control that flags abnormal values only up to the level that the customers have a capacity to handle. As proactive and learned monitoring succeeds, customers can divert more administrative resources from correcting existing abnormalities to proactive monitoring.

The system and method of the invention can statistically guarantee customers the alerts they want over time. For instance, an installation with a 1000 computers, with 100 counters sampled every 15 minutes has approximately 10,000,000 (10 million) opportunities for alerts a day. If a customer wants to limit alerts to 100 per day, the customer needs to set the tolerance F accordingly.

Some customers might prefer multiple envelopes using F1, F2, and F3 for different envelopes such as informational, warning, and critical. Some others might choose to have different overshoot and undershoot envelopes.

The raw variables produced by most instrumentation have their own idiosyncrasies. The idiosyncrasies fall in the following three categories: (1) running counter with rollover; (2) bursty sampled data; and (3) monotonically increasing/decreasing absolute data.

In the first case of running count with rollover, the counters will only provide a running count. The consumer of the data is expected to take two snapshots over time, and compute the difference and rate. The computation gets a bit complex since the counter can rollover from the largest number back to zero.

In the second case of bursty sampled data, collected data is extremely spiky. The only way to use the data is to compute an area under the curve between fixed time periods.

In the case of monotonically increasing or decreasing absolute data, some variables tend to increase or decrease constantly such that weekly business cycles lose meaning. In this case, preprocessing should report rate of change over time, for example, in order to detect if a runaway program is suddenly filling up disk space.

Based on the aforementioned variables and methods, a signature model is described by equations 5 and 6.

$$\text{New}XS(t) = (L/1+L)*XS(t) + (1/1+L)*(XC_{movingavg}(t, \text{TimeTolerance})) \quad (5)$$

$$(\text{NewSigma}S(t))^2 = (L/1+L)*(\text{Sigma}S(t)^2 + XS(t)^2) + (1/1+L)*((\text{Sigma}C(t, \text{TimeTolerance}))^2 + (XC_{movingavg}(t, \text{TimeTolerance}))^2) - \text{New}XS(t)^2 \quad (6)$$

In the signature provided above, XC(t) is a time variant numeric variable. XS(t) and SigmaS(t) are the two components of the precomputed signature for the variable XC(t). $XC_{movingavg}$ (t, deltaT) is the moving average of XC(t) taken over the period between t-deltaT and t. SigmaC (t, deltaT) is the standard deviation over the period t-deltaT and t for XC(t). 1/L is the learning responsiveness ratio as described above.

Abnormalities are calculated based on the following equations related to the signature. XC(t) is abnormal if:

$$XC_{movingavg}(t, \text{jitterspread}) < [XS(t+\text{jitteroffset}) - F*\text{Sigma}S(t+\text{jitteroffset})] \quad (7)$$

OR $$XC_{movingavg}(t, \text{jitterspread}) > [XS(t+\text{jitteroffset}) + F*\text{Sigma}S(t+\text{jitteroffset})] \quad (8)$$

The first violation as described by equation (7) is called an undershoot and the second violation as described by equation (8) is called an overshoot. Jitterspread is the jitter spread as described above and Jitteroffset is the jitter offset as described above. TimeTolerance is equal to (2* Jitteroffset+Jitterspread) and F is the tolerance.

Figure 9A:
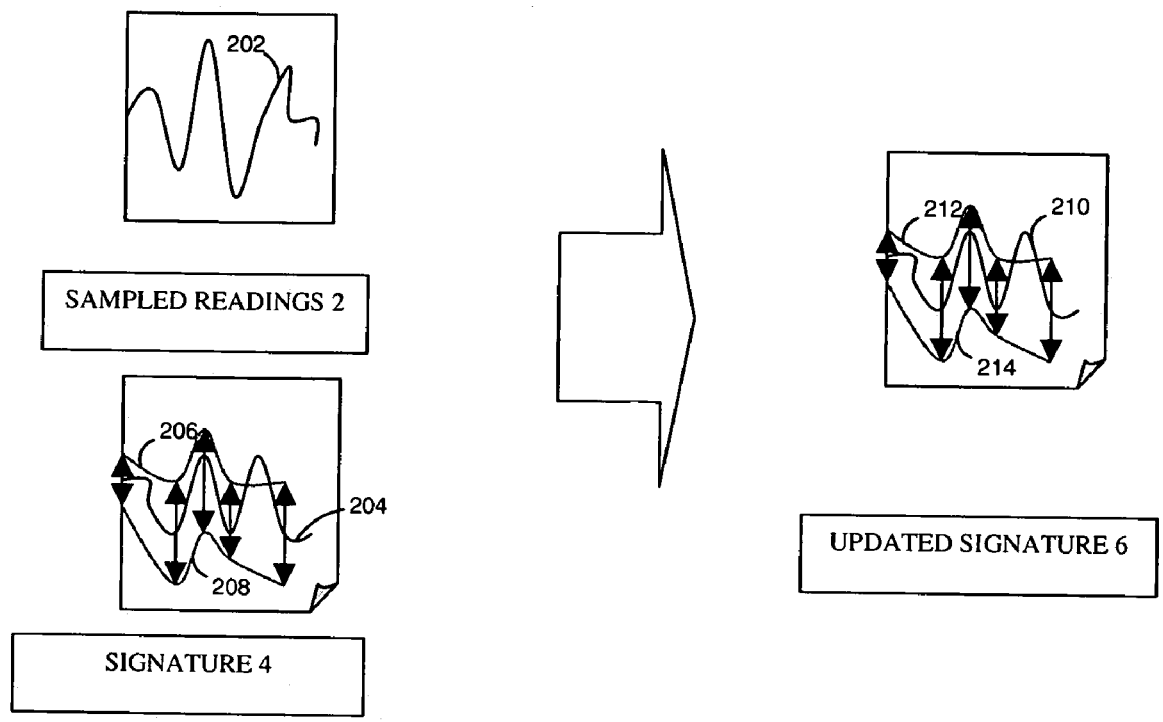
FIG. 9A includes an illustration of the signature updating process.

FIG. 9A provides an illustration of the signature updating process. FIG. 9A includes sample readings 2. The sampled readings 2 include a curve 202 representing the sampled values XC(t). FIG. 9A also includes a signature 4. The middle curve 204 represents XS(t), the average signature value. The upper curve 206 represents the uppermost normal values and the lower curve 208 represents the lowermost normal values. FIG. 9A also includes an update signature 6. The updated signature 6 includes a curve 210 representing XS(t) after consideration of the sampled values XS(t) and the upper normal limit represented by the curve 212, and the lower normal limit represented by the curve 214.

Figure 9B:
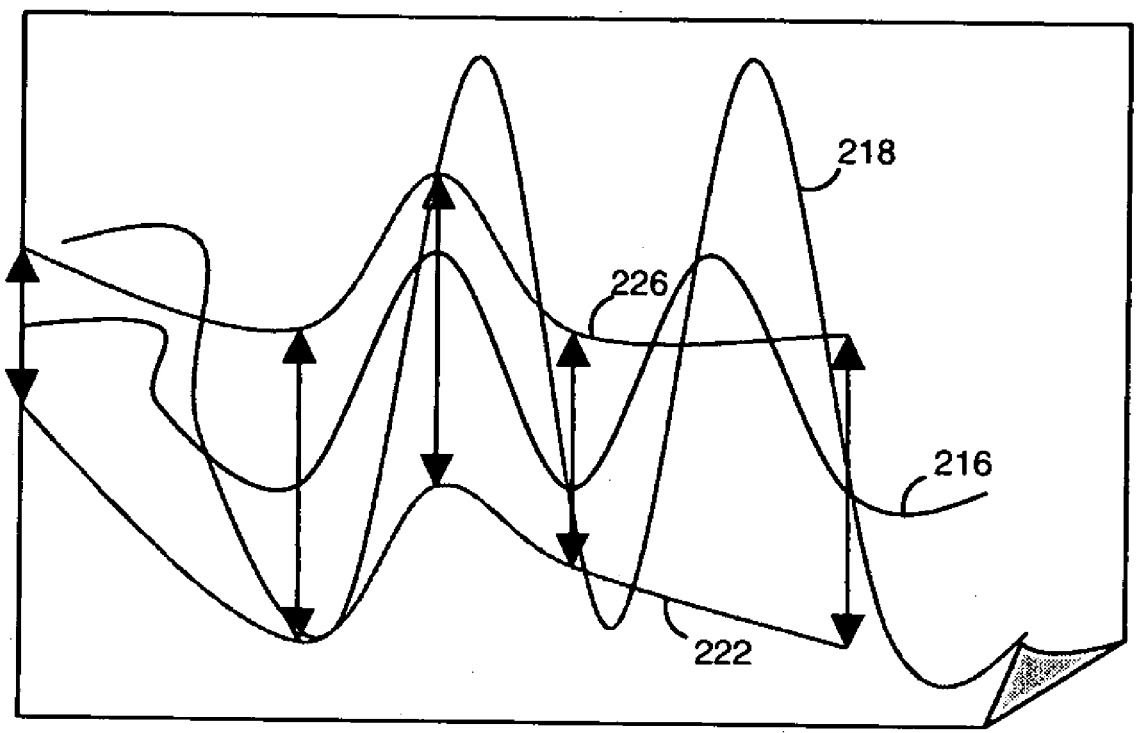
FIG. 9B illustrates a previously computed signature compared with a sample signal.

FIG. 9B illustrates a previously computed signal 216 compared with a sample signal 218. The sample signal 218 exceeds the upper normal limit 220 at two points and the lower normal limit 222 at point. As shown, the comparison helps to identify overshoots and undershoots.

Determining a Source of Abnormalities

As described above, embodiments of the method and system of the invention monitor system parameters for abnormalities. The system and method convert numeric data streams into a state representing either normal or abnormal behavior for any process. Additionally, as shown in Table 1 below, four sub-states can be found depending on the type of process variable tracked.

The monitoring method also facilitates root cause analysis so that when detected, abnormalities can be eliminated by determining and correcting a root cause. Root cause analysis depends on following the chain of faulty/abnormal monitors from a system or subsystem to other subsystems and systems. Root cause analysis has rules of the type: (1) An abnormality of type F1 in System of type 1 can be caused by an abnormality of type F2 on the same system; and (2) An abnormality of type F1 in System of type 1 can be caused by an abnormality of type F2 on system of type 2 if System 1 and system 2 have a relationship of type R1.

Root cause analysis depends on recognizing which aspects of which systems are abnormal. Specifically within a system, if the system for detecting abnormalities detects parameters including usage, utilization, error, and response in a specific state, pure knowledge rules can interpret root causes. Examples of these pure knowledge rules are set forth below in Table 1.

TABLE 1

| Usage | Utilization | Error | Response | Interpretation |
|---|---|---|---|---|
| N | N | N | N | Either everything is normal or the tolerance is set too loosely |
| N | N | N | A | If only response times are abnormally high, while everything else is normal, response delays are likely caused by an external system- e.g. an application is running slowly because an external database is slow in responding |
| N | N | A | N | Abnormal errors can be caused by abnormal errors downstream, mis-configuration or badly formed/illegal requests. |
| N | N | A | A | Errors that cause retries also cause response delays. |
| N | A | N | N | Abnormally low utilization while everything else is normal can be a sign of "running dry" where the transactions are completed without doing any heavy lifting. Abnormally high utilization while everything else is normal indicates a mistake in resource management configuration - eg. - a 10 meg Ethernet setting instead of 100. |
| N | A | N | A | Utilization beyond the "knee" causes nonlinear response degradation. In this case, the root cause is mis-configured resource management rather than usage. |
| N | A | A | N | Abnormal error rates can increase utilizations even if the usage is normal, specifically, if the inbuilt mechanisms retry. Abnormal internal error rates can be caused by abnormally high utilizations, especially when the internal mechanism to handle stress causes errors such as dropping of requests. |
| N | A | A | A | Abnormal error rates are increasing utilization and response times because of retry logic. |
| A | N | N | N | Abnormal usage on a system can be caused by abnormal usage upstream ultimately caused by abnormal external conditions. Abnormally low usage is also a sign of problems; maybe an upstream node is dead. |
| A | N | N | A | Probably unconnected |
| A | N | A | N | An abnormally high usage and error rate could be an indicator of abuse/hacking. |
| A | N | A | A | Response can be abnormal if the utilization is abnormal or if the errors are abnormal. |
| A | A | N | N | Abnormal usage is causing abnormal utilizations. This is still before the knee and hence not affecting response or errors. |
| A | A | N | A | Response can be abnormal if the utilization is abnormal. Utilization beyond the "knee" causes nonlinear response degradation. |
| A | A | A | N | Abnormal usage is causing abnormal utilization and errors. This is still under the radar and is not affecting response yet, but may cause impact response later. |
| A | A | A | A | Everything is abnormal. It is possible that the signature is not initialized or tolerance is set too low. |

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. One or more computer storage media having computer-useable instructions embodied thereon for performing a method for monitoring a process, the method comprising:
   creating a signature representative of the process;
   continuously updating the created signature with a weighting scheme; and
   detecting abnormalities based upon the continuously updated signature,
   wherein the process is related to usage of networked computing devices in a datacenter,
   wherein the signature includes information related to time-sensitive averaging that accounts for variation in a business cycle,
   wherein the weighting scheme consists of a first weighting factor that represents a continuously updated signature weight and a second weighting factor that represents a current data weight,
   wherein creating a signature comprises accelerated learning through setting a learning responsiveness ratio and incrementally increasing the learning responsiveness ratio until the learning responsiveness ratio reaches a desired value, and
   wherein the learning responsiveness ratio is equated to the second weighting factor divided by the first weighting factor.

2. The media of claim 1, wherein creating a signature comprises calculating an average and a standard deviation.

3. The media of claim 2, wherein creating a signature comprises initially repeating a running average and standard deviation through a plurality of intervals.

4. The media of claim 1, wherein updating the created signature comprises ensuring that recently recorded data has a greater impact than older data by setting the second weighting factor to a value greater than the first weighting factor.

5. The media of claim 1, wherein updating the created signature comprises utilizing a moving average over a time to account for events occurring at unexpected times.

6. The media of claim 1, wherein detecting abnormalities comprises determining if measured values are above an upper threshold or below a lower threshold.

7. The media of claim 1, further comprising calculating upper and lower threshold limits based on jitter offset.

8. One or more computer storage media having computer-useable instructions embodied thereon for performing a method for detecting abnormalities occurring during a process based upon a continuously updated signature representative of the process, the method comprising:
   creating a signature representative of the process;
   continuously updating the created signature with a weighting scheme;
   continuously monitoring a system parameter;
   computing a normal range of values for the system parameter based on the continuously updated signature;
   determining if the monitored system parameter is within the normal range; and
   indicating existence of an abnormality if the monitored system parameter is outside of the normal range,
   wherein the process is related to usage of networked computing devices in a datacenter,
   wherein the weighting scheme consists of a first weighting factor that represents a continuously updated signature weight and a second weighting factor that represents a current data weight,
   wherein creating a signature comprises accelerated learning through setting a learning responsiveness ratio and incrementally increasing the learning responsiveness ratio until the learning responsiveness ratio reaches a desired value, and
   wherein the learning responsiveness ratio is equated to the second weighting factor divided by the first weighting factor.

9. The media of claim 8, further comprising creating a signature by calculating an average and a standard deviation.

10. The media of claim 9, wherein creating a signature comprises initially repeating the running average and standard deviation through a plurality of intervals.

11. The media of claim 8, wherein computing a normal range of values comprises ensuring that recently recorded data has a greater impact than older data by setting the second weighting factor to a value greater than the first weighting factor.

12. The media of claim 8, wherein computing a normal range of values comprises utilizing a moving average over a time to account for events occurring at unexpected times.

13. The media of claim 8, wherein determining whether a monitored system parameter is within a normal range of values comprises determining if monitored system parameters are above an upper threshold or below a lower threshold.

14. The media of claim 13, further comprising calculating upper and lower threshold limits based on jitter offset.

15. One or more computer storage media having computer-useable instructions embodied thereon for performing a method for creating a signature useful for detecting abnormalities in a computing system environment, the method comprising:
   setting a learning responsiveness ratio;
   monitoring a system parameter;
   adjusting the learning responsiveness ratio at fixed intervals until a desired value is reached;
   calculating an average and standard deviation for each interval; and
   using the average, standard deviation and learning responsiveness ratio to create the signature,
   wherein the learning responsiveness ratio is equated to a weighting factor that represents current data divided by a weighting factor that represents the signature,
   wherein the abnormalities in the computing system environment relate to usage of networked computing devices in a datacenter, and
   wherein the signature includes information related to time-sensitive averaging that accounts for variation in a business cycle.

16. The media of claim 15, further comprising continuously updating the created signature through a weighting scheme, wherein the weighting scheme consists of a first weighting factor that represents a continuously updated signature weight and a second weighting factor that represents a current data weight.

17. The media of claim 16, further comprising detecting abnormalities based on the updated signature.

18. The media of claim 17, wherein detecting abnormalities comprises determining if measured values are above an upper threshold or below a lower threshold.

19. The media of claim 17, further comprising calculating upper and lower threshold limits based on jitter offset.

20. The media of claim 16, wherein updating the created signature comprises ensuring that recently recorded data has a greater impact than older data by setting the second weighting factor to a value greater than the first weighting factor.

21. The media of claim 16, wherein updating the created signature comprises utilizing a moving average over a time to account for events occurring at unexpected times.

22. The media of claim 15, wherein creating a signature comprises initially repeating the running average and standard deviation through a plurality of intervals.

23. A computerized system including one or more computer storage media for detecting abnormal activity in a computerized environment, the system comprising:
    monitoring tools stored on the computer storage media for continuously monitoring a system parameter; and
    a continuously updated signature representative of typical values of the system parameter
    an abnormality indicator calculated based on the continuously updated signature, the abnormality indicator including a range of typical values for the system parameter,
    wherein the signature is continuously updated with a weighting scheme,
    wherein the weighting scheme consists of a first weighting factor representing the weight of the continuously updated signature and a second weighting factor representing the weight of current data,
    wherein the abnormal activity is related to abnormal usage of networked computing devices in a datacenter,
    wherein the signature includes information related to time-sensitive averaging that accounts for variation in a business cycle,
    wherein the signature is created by accelerated learning through setting a learning responsiveness ratio and incrementally increasing the learning responsiveness ratio until the learning responsiveness ratio reaches a desired value, and
    wherein the learning responsiveness ratio is equated to the second weighting factor divided by the first weighting factor.

24. The system of claim 23, wherein the continuously updated signature comprises an average and a standard deviation.

25. The system of claim 23, wherein the continuously updated signature comprises the second weighting factor having a greater value than the first weighting factor to ensure that recently recorded data has a greater impact than older data.

26. The system of claim 23, wherein the continuously updated signature comprises a moving average over time to account for events occurring at unexpected times.

27. The system of claim 23, wherein the abnormality indicator determines whether a monitored system parameter is within a normal range of values and whether monitored system parameters are above an upper threshold or below a lower threshold.

28. The method of claim 23, wherein the abnormality indicator calculates upper and lower threshold limits based on jitter offset.

29. A computerized monitoring system including one or more computer storage media for monitoring a process, the monitoring system comprising:
    a signature creation module, stored on the one or more computer storage Media, for creating a signature representative of the process;
    a signature updating module, stored on the one or more computer storage Media, for continuously updating the created signature; and
    an abnormality detection module, stored on the one or more computer storage media, for detecting abnormalities based upon deviations from the updated signature,
    wherein the signature is continuously updated with a weighting scheme,
    wherein the weighting scheme consists of a first weighting factor that represents a continuously updated signature weight and a second weighting factor that represents a current data weight,
    wherein the signature creation module comprises tools for performing accelerated learning through incrementally increasing a learning responsiveness ratio until the learning responsiveness ratio reaches a desired value,
    wherein the learning responsiveness ratio is equated to the second weighting factor divided by the first weighting factor,
    wherein the process is carried out on a computer and is related to usage of networked computing devices in a datacenter, and
    wherein the signature includes information related to time-sensitive averaging that accounts for variation in a business cycle.

30. The system of claim 29, wherein the signature creation module includes tools for calculating an average and a standard deviation.

31. The system of claim 30, wherein creating a signature comprises initially repeating the running average and standard deviation through a plurality of intervals.

32. The system of claim 29, wherein the signature updating module comprises tools for ensuring that recently recorded data has a greater impact than older data by setting the second weighting factor to a value greater than the first weighting factor.

33. The system of claim 29, wherein the signature updating module comprises tools for calculating a moving average over a time to account for events occurring at unexpected times.

34. The system of claim 29, wherein the abnormality detection module determines if monitored system parameters are above an upper threshold or below a lower threshold.

35. The method of claim 29, wherein the abnormality detection module includes a mechanism for calculating upper and lower threshold limits based on jitter offset.

36. One or more computer storage media having computer-useable instructions embodied thereon for performing a method for distinguishing between normal and abnormal behavior during a process, the method comprising:
    creating a signature representative of the process;
    continuously updating the created signature with a weighting scheme;
    monitoring a system parameter;
    converting a numeric data stream representative of the monitored system parameter to a state for the process; and distinguishing between normal and abnormal behavior based on the state, wherein the process is related to usage of networked computing devices in a datacenter, wherein the weighting scheme consists of a first weighting factor that represents a continuously updated signature weight and a second weighting factor that represents a current data weight, wherein the system parameter includes at least one of a usage variable, utilization, an error, and turnaround time, wherein distinguishing between normal and abnormal behavior includes utilizing time-sensitive averaging to account for variation in a business cycle, wherein the signature is created by accelerated learning through setting a learning responsiveness ratio and incrementally increasing the learning responsiveness ratio until the learning responsiveness ratio reaches a desired value, and wherein the learning responsiveness ratio is equated to the second weighting factor divided by the first weighting factor.

37. The media of claim 36, further comprising converting the numeric data streams to multiple sub-states.

38. The media of claim 36, further comprising determining a root cause of an abnormality based on the state.

* * * * *

UNITED STATES PATENT AND TRADEMARK OFFICE
CERTIFICATE OF CORRECTION

PATENT NO. : 7,624,174 B2  Page 1 of 1
APPLICATION NO. : 10/685472
DATED : November 24, 2009
INVENTOR(S) : Ashvinkumar Jayantilal Sanghvi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this

Fourteenth Day of December, 2010

David J. Kappos
*Director of the United States Patent and Trademark Office*